(12) United States Patent
Trentacosta

(10) Patent No.: US 11,097,800 B1
(45) Date of Patent: Aug. 24, 2021

(54) MOTORCYCLE BACKPACK

(71) Applicant: Theresa A. Trentacosta, Tinton Falls, NJ (US)

(72) Inventor: Theresa A. Trentacosta, Tinton Falls, NJ (US)

( * ) Notice: Subject to any disclaimer, the term of this patent is extended or adjusted under 35 U.S.C. 154(b) by 0 days.

(21) Appl. No.: 16/856,633

(22) Filed: Apr. 23, 2020

(51) Int. Cl.
*B62J 9/26* (2020.01)
*A45F 3/04* (2006.01)
*B62J 9/27* (2020.01)

(52) U.S. Cl.
CPC ...... *B62J 9/26* (2020.02); *A45F 3/04* (2013.01); *B62J 9/27* (2020.02)

(58) Field of Classification Search
CPC ....... B62J 9/26; B62J 9/27; A45F 3/04; A45F 3/047
See application file for complete search history.

(56) References Cited

U.S. PATENT DOCUMENTS

| | | | | | |
|---|---|---|---|---|---|
| 4,153,092 | A | * | 5/1979 | Haslam | A45C 3/00 150/108 |
| 5,407,112 | A | * | 4/1995 | Christodoulou | A41D 15/04 2/94 |
| 5,544,792 | A | * | 8/1996 | Arnwine | A45C 7/0086 224/153 |
| D404,563 | S | * | 1/1999 | Rausch | D3/216 |
| 6,138,881 | A | * | 10/2000 | Paul | A45F 3/02 224/153 |
| 6,460,746 | B1 | * | 10/2002 | Amram | A45F 3/047 224/579 |
| 7,270,254 | B2 | * | 9/2007 | Kakouras | F41C 23/02 224/150 |
| 7,377,299 | B2 | * | 5/2008 | Gerber | A45C 13/26 150/108 |
| 7,721,777 | B2 | * | 5/2010 | Costello | A45C 7/0068 150/103 |
| 8,985,420 | B2 | * | 3/2015 | Dapkins, Jr. | A45F 3/14 224/579 |
| D835,473 | S | * | 12/2018 | Jacobsen | D7/607 |

(Continued)

*Primary Examiner* — Brian D Nash
(74) *Attorney, Agent, or Firm* — Lawrence B. Goodwin; Mandelbaum Salsburg P.C.

(57) ABSTRACT

A bag that can be releasably attached to and detached from a seatback having at least one supporting post is disclosed. It includes a bag body having a top and bottom, and a pair of straps disposed laterally with respect to each other on the bag body. Each of the straps is connected to the bag body at an upper connection point near the top, and a lower connection point near the bottom. A zipper is provided for selectively connecting and separating the straps from each other, by selectively zipping and unzipping the zipper. At least one bag connector is disposed on the bag near the bottom, and a strap connector is disposed on at least one of the straps at a point closer to the lower connection point than the upper connection point. The bag connector and strap connector are adapted to be releasably connected to each other. The bag is configured to be attached to the seatback by wrapping the straps around the seatback, zipping the straps together, and applying the strap connector to the bag connector around the at least one supporting post, to thereby trap the supporting post between the bag connector and the lower connection point.

7 Claims, 3 Drawing Sheets

(56) References Cited

U.S. PATENT DOCUMENTS

| | | | | |
|---|---|---|---|---|
| 2004/0011840 A1* | 1/2004 | Lovett | .................... | A45C 13/30 |
| | | | | 224/584 |
| 2007/0152007 A1* | 7/2007 | Kauss | ....................... | A45F 3/14 |
| | | | | 224/637 |
| 2019/0265750 A1* | 8/2019 | Crowder | ............... | G06F 1/1628 |
| 2021/0007467 A1* | 1/2021 | Paulus | ..................... | A45F 3/02 |
| 2021/0052044 A1* | 2/2021 | Fridman | ................ | A44B 19/36 |
| 2021/0093074 A1* | 4/2021 | Williams | ................ | A45F 3/047 |

\* cited by examiner

MOTORCYCLE BACKPACK

FIELD OF THE INVENTION

The present invention is generally related to a bag, backpack, satchel, purse, or the like, for people who may travel by motorcycle or similar vehicle.

BACKGROUND

When riding on a motorcycle, riders often need to carry bags, backpacks or purses. These riders sometimes may have access to a larger compartment or bag that is permanently mounted on the motorcycle, and when available, the rider may place their bags therein. In some cases, however, where such permanently attached compartments or bags are not available, riders who need to carry bags or purses have had to wear an over-the-shoulder strapped backpack or purse which they must wear while they ride. These bags can be uncomfortable, cumbersome and, in some cases, dangerous to wear while riding.

SUMMARY OF THE INVENTION

It is therefore an object of the present invention to overcome the drawbacks associated with the prior art, by providing a bag, backpack, purse or the like, that is modified to allow secure attachment to a motorcycle seatback or similar expedient. In particular the present invention is directed to a bag, backpack, purse, or the like, that is easily connected to a motorcycle's sissy bar or seatback, and easily removed so it can be taken with the rider once they get to their destination. The bag in accordance with the present invention is portable and transferable from the seatback to the rider, or from one motorcycle to another, and is much more fashionable than, for example, over-the-shoulder flat purses.

More specifically, the present invention is directed to a bag that can be releasably attached to and detached from a seatback having at least one supporting post. The bag includes a bag body having a top and bottom, a pair of straps disposed laterally with respect to each other on the bag body. Each of the straps is connected to the bag body at an upper connection point near the top, and a lower connection point near the bottom. A zipper is provided for selectively connecting and separating the straps from each other, by selectively zipping and unzipping the zipper. At least one bag connector is disposed on the bag near the bottom, and a strap connector is disposed on at least one of the straps at a point closer to the lower connection point than the upper connection point. The bag connector and strap connector are adapted to be releasably connected to each other. The bag is configured to be attached to the seatback by wrapping the straps around the seatback, zipping the straps together, and applying the strap connector to the bag connector around the at least one supporting post, to thereby trap the supporting post between the bag connector and the lower connection point.

Preferably, the strap connectors are disposed on both of the straps, the seatback includes a pair of supporting posts, and the bag is configured to be attached to the seatback by applying both of the strap connectors to the bag connector around respective ones of the supporting posts, to thereby trap the supporting posts between the bag connector and the lower connection points for each of the straps.

In accordance with a preferred embodiment, the bag is a backpack, the bag and strap connectors are comprised of VELCRO® fasteners, and the backpack is comprised of leather.

Although the specific example of the bag in accordance with the present invention is a backpack, the present invention is not limited thereto, and it will be appreciated that the invention may be used with other kinds of bags, such as purses, or the like. Accordingly, the term "backpack" as used herein shall be construed to include backpacks as well as other bags, purses, satchels, containers, or the like. Further, although the invention is described as being applied to a motorcycle seatback, it may find applications with other vehicles having a suitable seatback, such as bicycles, motor scooters, or the like.

BRIEF DESCRIPTION OF THE DRAWINGS

These and other objects and aspects of the invention will be described by reference to the following drawings, of which.

DETAILED DESCRIPTION

Figure 1:
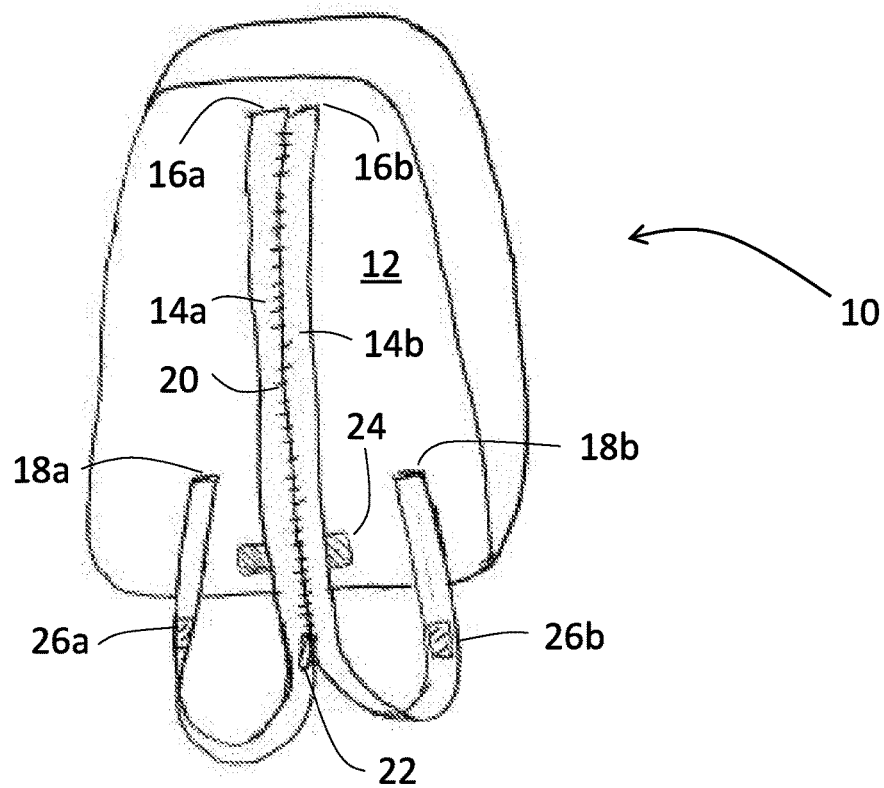
FIG. 1 is a perspective view of the strap-side of the backpack in accordance with the present invention, with its straps zipped together.
Figure 2:
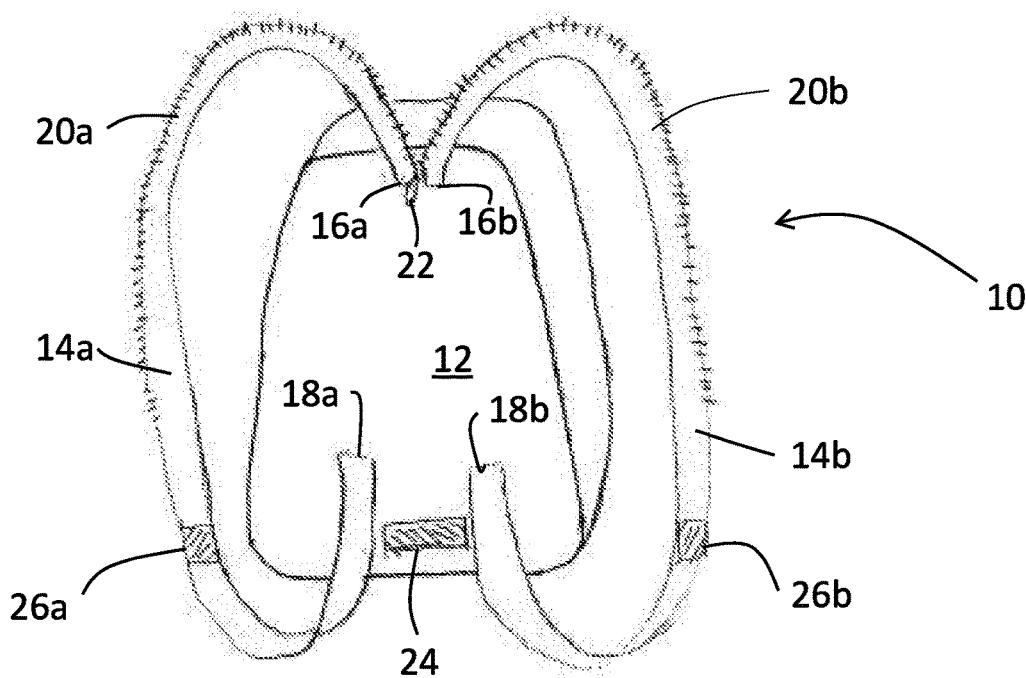
FIG. 2 is a is a perspective view of the strap-side of the backpack in accordance with the present invention with its straps unzipped.

The backpack 10, in accordance with the present invention, is shown in FIGS. 1 and 2. The backpack is comprised of body 12, a pair of shoulder straps 14a, 14b, laterally disposed relative to each other and attached to the upper portion of body 12 at respective upper attachment points 16a and 16b, and attached to the lower portion of body 12 at respective lower attachment points 18a and 18b, as shown. The straps 14a and 14b are selectively attached to each other, or separated, by a zipper 20, the complementary sides thereof being shown in FIG. 2 as zipper portions 20a and 20b. The zipper has a standard zipper tab 22 to allow the user to selectively zip the straps together, as shown in FIG. 1, and unzip and thus separate the straps as shown in FIG. 2. The body and straps may be made of various combinations of leather, or natural or synthetic fabrics.

Thus far, the backpack as described is commonly available from manufacturers and retailers of backpacks, luggage, sporting goods, leather goods, motorcycles, and others. In accordance with the present invention, however, the backpack is modified through the application of three fasteners, as shown in the figures: a first backpack body fastener 24 is secured to the body 12 near the bottom of the strap-side thereof, and a pair of strap fasteners 26a and 26b are secured to the respective straps 20a and 20b between the attachment points 16a/18a, and 16b/18b, respectively, but closer to the lower attachment points 18a and 18b, than the upper attachment points 16a and 16b, as shown in FIG. 2. Preferably, the fasteners 24 and 26a/26b are comprised of VELCRO® fasteners (or similar), but they may also be comprised of combinations of snaps, buttons, loops or other expedients that will allow the attachment and release of the fasteners 26a/26b to and from fastener 24. Although a single fastener 24 is shown in the figures, a plurality of fasteners may be used near the bottom of the bag, for example a separate fastener for each of fasteners 26a and 26b, if desired.

Figure 3:
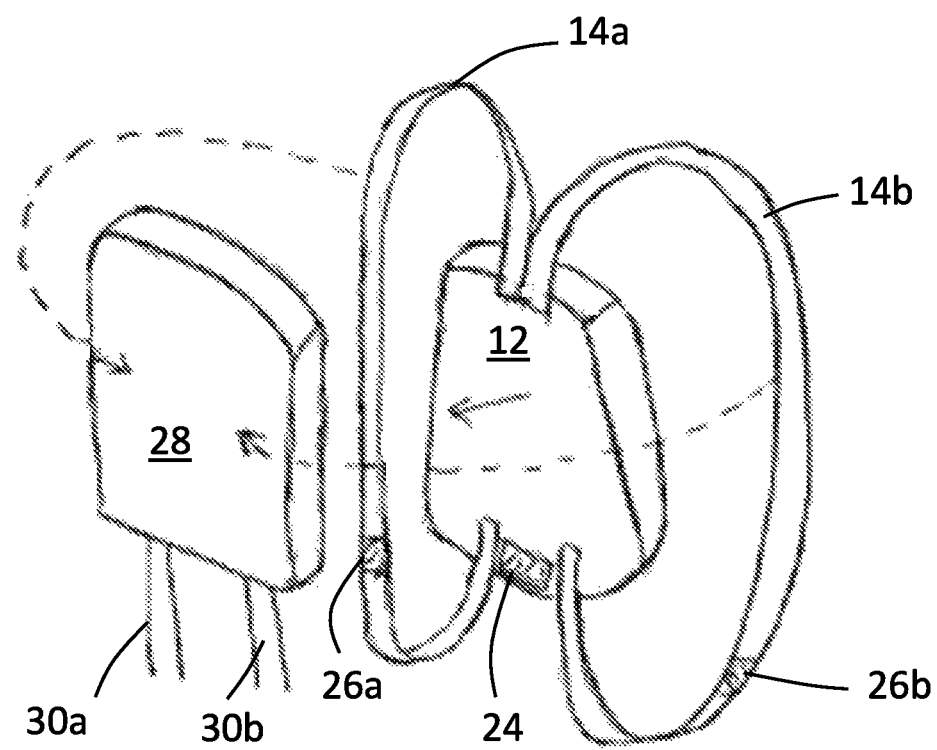
FIG. 3 is a perspective view of the backpack in accordance with the present invention in relation to a motorcycle seatback.
Figure 4:
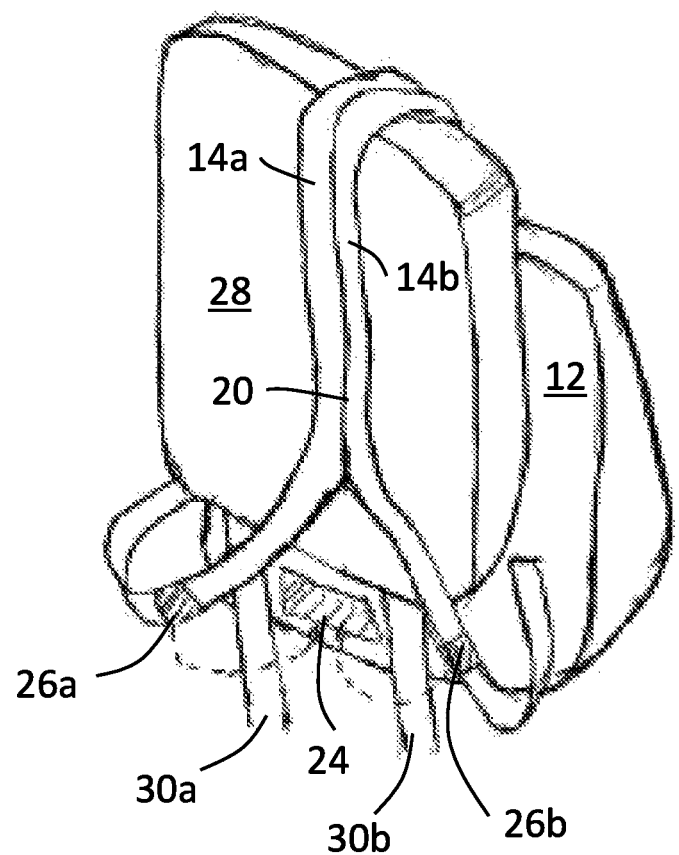
FIG. 4 is a perspective view of the backpack in accordance with the present invention as it is being attached to a motorcycle seatback.
Figure 5:
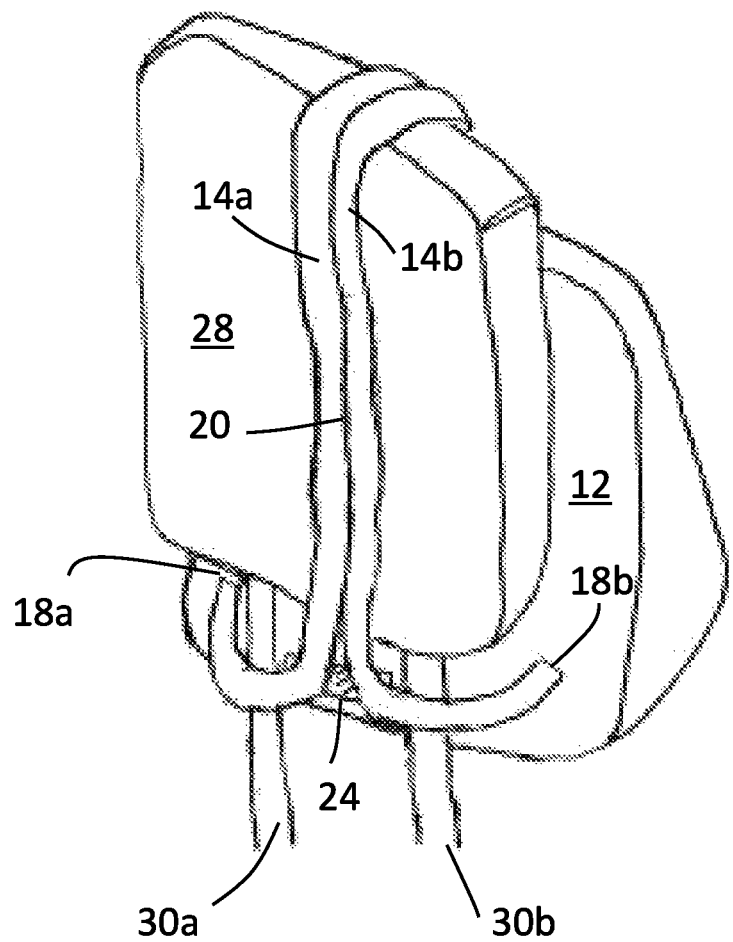
FIG. 5 is a perspective view of the backpack in accordance with the present invention fully attached to a motorcycle seatback.

The attachment of the backpack to a motorcycle seatback will be described with reference to FIGS. 3-5. A motorcycle seatback (or "sissy-bar") 28 is typically connected to the motorcycle frame at its lower edge by a pair of posts 30a, 30b. The first step in attaching the backpack to the seatback is shown in FIG. 3. The user will unzip zipper 20 to separate the straps 14a, 14b. The backpack is then positioned, in the direction of the arrow in FIG. 3, at the rear-side of the seatback. The straps 20a, 20b are then wrapped around to the front of the seatback and zipped together, as shown in FIG. 4. Then the user applies the fasteners 26a and 26b individually to fastener 24, as shown in FIG. 5. Thus, in this configuration, strap 14a captures post 30a between fastener 24 and lower attachment point 18a, and strap 14b captures post 30b between fastener 24 and lower attachment point 18b, so that the backpack 12 remains firmly and securely attached to the seatback 28. To release the backpack from the seatback, the user reverses the above-described procedure by releasing the fasteners 26a, 26b from fastener 24, unzipping the zipper 20 to separate the straps 14a, 14b, unwrapping the straps from the seatback 28, and removing the backpack. At this point, the user can make normal use the backpack, as desired.

While the foregoing is directed to embodiments of the present invention, further objects, aspects and embodiments of the invention will be appreciated by those in the art, without departing from the scope of the invention, which will be defined by the following claims.

I claim:

1. A bag capable of being releasably attached to and detached from a seatback having at least one supporting post, comprising:
   a. a bag body having a top and bottom;
   b. a pair of straps disposed laterally with respect to each other on said bag body, each of said straps connected to said bag body at an upper connection point near said top, and a lower connection point near said bottom;
   c. a zipper for selectively connecting and separating said straps from each other, by selectively zipping and unzipping said zipper;
   d. at least one bag connector disposed on said bag near said bottom and laterally separated from said lower connection point, and
   e. a strap connector disposed on at least one of said straps at a point separate and distanced from, but closer to, said lower connection point than said upper connection point, said bag connector and strap connector adapted to be releasably connected to each other.

2. The bag of claim 1 wherein said bag is capable of attachment to said seatback by wrapping said straps around said seatback, zipping said straps together, and applying said strap connector to said bag connector around said at least one supporting post, to thereby trap said supporting post between said bag connector and said lower connection point.

3. The bag of claim 2 wherein said bag is capable of attachment to a seatback having two supporting posts, and wherein said strap connectors are disposed on both of said straps at a point separate and distanced from, but closer to, said lower connection point than said upper connection point, said bag connector is disposed laterally in-between said lower connection points, and said bag is capable of attachment to said seatback by applying both of said strap connectors to said bag connector around respective ones of said supporting posts, to thereby trap said supporting posts between said bag connector and said lower connection points for each of said straps.

4. The bag of claim 2, wherein said bag is a backpack.

5. The bag of claim 4 wherein said bag and strap connectors are comprised of VELCRO® fasteners.

6. The bag of claim 5 wherein said backpack is comprised of leather.

7. The bag of claim 1, wherein said straps are permanently connected to said upper connection points and said lower connection points.

* * * * *